United States Patent

Brunelle et al.

[15] 3,707,032
[45] Dec. 26, 1972

[54] METHOD OF FORMING AN ABRASION RESISTANT HOSE ASSEMBLY

[72] Inventors: William Brunelle, Columbia City, Ind.; James W. Cartwright, Columbus, Ohio

[73] Assignee: The Weatherhead Company

[22] Filed: Nov. 20, 1970

[21] Appl. No.: 91,305

Related U.S. Application Data

[62] Division of Ser. No. 793,304, Jan. 23, 1969, abandoned.

[52] U.S. Cl. ...............29/460, 138/110, 264/251, 285/45
[51] Int. Cl. ...........................B23p 3/00, B23p 19/04
[58] Field of Search............29/460, 508; 264/251 X; 285/45 X; 138/110 X

[56] References Cited

UNITED STATES PATENTS

| | | | |
|---|---|---|---|
| 1,087,443 | 2/1914 | Hallgreen | 138/110 UX |
| 1,435,311 | 11/1922 | Knight | 138/110 |
| 2,465,656 | 3/1949 | Morin | 264/251 |
| 3,047,025 | 7/1962 | Davis | 138/110 UX |
| 3,294,122 | 12/1966 | Sharp | 138/110 |
| 3,320,665 | 5/1967 | Morse | 29/460 |

FOREIGN PATENTS OR APPLICATIONS

| | | | |
|---|---|---|---|
| 167,488 | 2/1906 | Germany | 138/110 |
| 834,426 | 5/1960 | Great Britain | 264/251 |

*Primary Examiner*—Charlie T. Moon
*Attorney*—McNenny, Farrington, Pearne & Gordon

[57] ABSTRACT

An abrasion resistant flexible hose assembly includes a length of flexible hose having hose end fittings attached to its ends and abrasion resistant means in the form of separate annular bumpers arranged along the hose in longitudinally spaced positions. Each bumper encircles a small portion of the length of the hose and cooperates with the other bumpers to protect the hose from abrading engagement with adjacent structures. The bumpers individually engage the hose with a shrink fit to maintain their spacing.

4 Claims, 2 Drawing Figures

PATENTED DEC 26 1972

3,707,032

INVENTORS
WILLIAM BRUNELLE,
& JAMES W. CARTWRIGHT
BY
McNENNY, FARRINGTON, PEARNE & GORDON

ATTORNEYS

METHOD OF FORMING AN ABRASION RESISTANT HOSE ASSEMBLY

This application is a division of application Ser. No. 793,304, filed Jan. 23, 1969, now abandoned.

BACKGROUND OF THE INVENTION

This invention relates generally to hose assemblies and more particularly to a novel and improved abrasion resistant means for protecting a flexible hose assembly from abrading engagement with adjacent structures.

Flexible hose assemblies are utilized generally to transfer fluids between spaced fluid pressure lines or the like at various conditions of temperature and pressure, particularly where there is relative movement between the lines. One such use of flexible hose assemblies is the establishment of fluid communication between the hydraulic brake lines mounted on the chassis of an automobile and the hydraulic brake lines mounted on the front and rear suspension members which lead to the individual wheel cylinders. In such use, the close proximity of the flexible hose to the adjacent chassis and suspension components in conjunction with the wide range of flexing requirements and the great number of flexing cycles create a possibility of adverse effects on the flexible hose by abrasion, chafing or rubbing. In view of this potential safety hazard, there is an increased need to provide an abrasion resistant means to prevent hose failures.

Prior art abrasion resistant devices have, in general, provided a one-piece protective sleeve which is installed on a length of flexible hose before the end fittings are assembled thereon. One such prior art structure provides a ribbed rubber sleeve having spaced rings of relatively great wall thickness interconnected by portions which are very thin. The thick rings are provided to maintain adequate abrasion resistance, while the thin interconnecting portions maintain proper spacing between the rings without excessively decreasing the flexibility of the hose assembly.

Although such prior art structures have been quite satisfactory in their operation, they are nevertheless subject to certain inherent difficulties. Abrasion resistant hose assemblies having these prior art one-piece sleeves are rather expensive to manufacture, since they necessitate the separate manufacturing steps of first making the sleeve and then installing it on the flexible hose. Furthermore, installing the sleeve on the hose is rather difficult, since the protective sleeve must have an inside diameter somewhat less than the outside diameter of the hose in order to form a tight interference fit and prevent movement of the sleeve after installation. Still further, these prior art protective sleeves must be composed of a material having a very high resilience so that they do not appreciably decrease the resilience of the flexible hose. However, materials which are most abrasion resistant are generally not very resilient; hence, these prior art protective sleeves must be made from a material which has a relatively great flexibility even though certain other materials might have greater abrasion resistance characteristics.

SUMMARY OF THE INVENTION

The present invention as herein set forth overcomes these and other problems of prior art abrasion resistant hose assemblies by providing the flexible hose with a plurality of substantially disjuncted bumpers which are arranged along the hose in predetermined positions of longitudinally spaced adjacency. The bumpers are secured to the hose in those predetermined positions by a shrink fit to eliminate the need for interconnecting spacers between adjacent bumpers. The length of the uncovered portions of the hose between adjacent bumpers and the length of the bumpers themselves are arranged to eliminate any appreciable loss of hose flexibility even though the bumpers might be less flexible and more abrasion resistant than the outer covering of the hose.

In a preferred embodiment, a length of flexible hose having crimped end fittings is provided with a plurality of individual bumpers. Each bumper encircles a small portion of the flexible hose, and all of the bumpers are arranged along the hose to cooperate with one another to protect the hose from abrading engagement with adjacent structures. The bumpers are preferably simultaneously molded directly onto the hose and are of a material that shrinks upon setting so that each bumper separately engages the hose with a shrink fit to prevent relative movement therebetween. The portion of the hose between two adjacent bumpers is not covered and is greater in length than one of the bumpers so that the flexibility of the hose is not appreciably decreased even though the bumpers are made of a rather rigid material such as polypropylene. Thus, it may be appreciated that the present invention not only obviates the necessity of first molding the bumpers and subsequently installing them on the hose, but furthermore it permits the bumpers to be made of a more rigid, more abrasion resistant material than the hose without diminishing the flexibility of the hose.

DESCRIPTION OF THE PREFERRED EMBODIMENT

Figure 1:
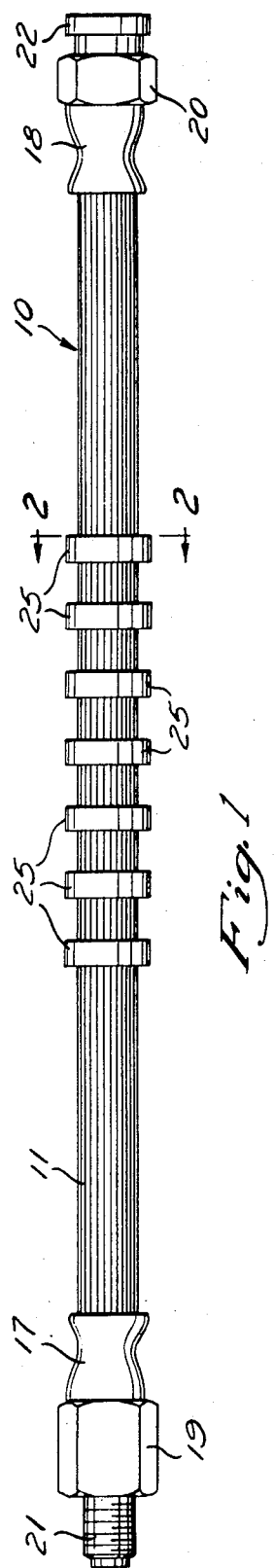
FIG. 1 is a side elevation of an abrasion resistant hose assembly according to the principles of this invention.
Figure 2:
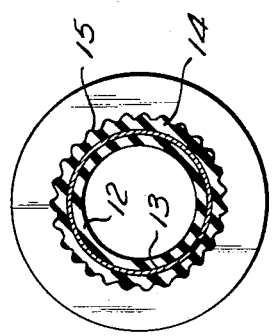
FIG. 2 is a cross sectional view of the hose assembly taken generally along reference view line 2—2 of FIG. 1.

Referring now to the drawings in greater detail, an abrasion resistant flexible hose assembly is indicated generally by reference numeral 10. The assembly may be used on an automobile hydraulic brake system or the like, and includes a piece of flexible hose 11 which comprises an inner rubber or plastic tube 12, a braided fabric or wire reinforcing layer 13 and an abrasion resistant rubber or plastic cover 14. The inner tube 12 is of a type that is impervious to the fluid that it is to carry and which retains a high degree of flexibility over a wide range of temperatures. The braided layer 13 is provided for additional strength to increase the burst and tensile strength of the hose. The cover 14, which may have a longitudinally serrated exterior surface 15, is provided for protective purposes and is made of a material that has a high resistance to abrasion, weather aging and solvents and which maintains a high degree of flexibility. Hose of this type is made in long extended lengths which are cut into smaller lengths such as the length of hose 11.

After the hose 11 has been cut to its desired length, metal hose end fittings 17 and 18 are secured on the ends of the tube in a suitable manner. Both fittings may be provided with enlarged wrench receiving portions 19 and 20 and with externally and internally threaded end portions 21 and 22 respectively.

In view of the previously described use of flexible hose assemblies in automotive hydraulic brake systems, it may be readily appreciated that two of the most important physical characteristics of hose assemblies such as assembly 10 are flexibility and resistance to abrasion. The present invention greatly increases the latter without appreciably decreasing the former, and does so at a low manufacturing cost.

According to the principles of the invention, the flexible hose 11 is provided with an abrasion resistant means which comprises a plurality of individual, disjuncted bumpers 25 arranged along the hose 11 in predetermined spaced positions. The bumpers are shown in the preferred embodiment with a smooth, continuous cylindrical exterior surface, but it may be appreciated that the exterior surface could be of nearly any shape, such as hexagonal or serrated cylindrical. Each bumper encircles a relatively small portion of the length of the flexible hose and cooperates with the other bumpers to protect the hose from abrasion, chafing or rubbing.

The bumpers do not require interconnecting spacing means, but instead utilize individual and separate engagement with the hose to maintain their proper spaced positions. By obviating the necessity for interconnecting spacing portions between adjacent bumpers, the invention permits the bumpers to be made of a more rigid, more abrasion resistant material than the exposed covering of the hose without appreciably diminishing the flexibility of the hose. For further purposes of hose flexibility, the bumpers 25 preferably have a length that is less than one-half the external diameter of the hose 11 and the distance between adjacent bumpers is greater than the length of a bumper. Tests that have been run on abrasion resistant hose assemblies incorporating the principles of the invention have shown that the disjuncted bumpers 25 do not reduce the performance capabilities (including strength and flexibility) of the hose and increase burst resistance somewhat in the bumper zone by the reinforcing effect.

In the preferred embodiment, the bumpers 25 are molded directly onto the external surface of the hose 11, thereby avoiding the necessity of first molding a protective sleeve and then installing it on the hose. The bumpers are made of a material that shrinks upon setting or curing, so that they each individually and separately engage the hose 11 with a shrink fit to maintain them in their predetermined positions of spaced adjacency and to prevent relative movement between the bumpers and the hose. Since the exterior surface of the hose cover 14 is longitudinally serrated, the molded bumpers 25 fill the grooves in the serrations to further advance the interlocking engagement between the bumpers and the hose. The bumpers are preferably made of a precolored, general purpose, black polypropylene. This material has a shrinkage factor of approximately 0.014 inch per inch and therefore insures a tight shrink fit between the bumpers and the hose.

Of course, other abrasion resistant materials may be used, depending upon such factors as cost, case of application and the nature of the cover material or the environment to which the hose assembly will be exposed. Normally, particularly when the outer cover is serrated, the shrink of the bumpers will provide a sufficient interference fit to hold the bumpers firmly in place. However, if the bumpers are to be applied to a smooth covered hose or additional adhesion is required, they can be bonded to the hose by applying a suitable chemical bonding agent to the surface of the hose before the bumpers are molded in place.

A particular advantage of this invention is that the bumpers can be applied selectively to hose assemblies after the metallic ends have been secured in place. It is only necessary to take the hose assembly and place it in a suitable injection molding die such as a split die formed with individual chambers for the bumpers. When this is done all the bumpers can be molded in place at the same time in a single operation, and depending upon the configuration of the mold, the spacing and size of the bumpers can be changed as desired. When the preferred material, polypropylene, is used, the molding temperature at the nozzle is 350° F, but since the material cools rapidly this high temperature does not have any deleterious effect on the hose cover which is usually of a weather-resistant material such as neoprene or a similar rubber-like material. Because of the high abrasion resistance of the polypropylene, it provides substantially more abrasion resistance than similar bumpers of a rubber-like material and is resistant to most solvents encountered in a brake hose application.

While the invention has been described in the preferred embodiment as applicable to a brake hose, it will be understood that the invention can be applied to different types of hose including those types without a protective cover in which the outer-most braid layer is normally exposed. In such case the bumper will adhere quite firmly to the braid layer by filling the spaces between the braid fibers or strands. Of course, other materials, including rubber, can be used for the bumpers depending upon the physical properties required.

We claim:

1. A method of forming an abrasion resistant hose assembly comprising the sequential steps of selecting a length of flexible hose having an outer surface, securing metallic hose fittings to each end of said hose, placing said hose in a mold formed to receive a portion of said hose interspacing the ends of the hose and including a plurality of chambers extending circumferentially around said hose in said mold, filling said chambers with a liquid plastic material at a temperature above the melting point of said plastic, allowing said plastic material to harden, and removing said hose from said mold with the solid plastic material forming shaped bumper members on the surface of said hose, each of said bumper members retaining the shape of the chamber in which it was formed and gripping the external surface of said hose with a shrink fit resulting from the thermal contraction of said plastic material around the outer surface of said hose.

2. The method of forming an abrasion resistant hose assembly as set forth in claim 1 wherein said outer surface has longitudinally extending serrations therein and the step of filling said chambers with a liquid plastic material includes disposing a portion of said plastic material into said serrations within said bumper members to provide said bumper members with an internal surface which is mechanically interlocked with said outer surface thereby fixing said bumper members against relative rotation.

3. A method of forming an abrasion resistant hose assembly comprising first securing metallic end fittings to the ends of a length of flexible hose and then frictionally locking a plurality of bumper members about said hose at spaced locations intermediate the ends thereof, the step of frictionally locking said bumper members about said hose including providing a mold having a plurality of chambers arranged to close circumferentially around said hose at spaced locations interspacing the ends thereof, placing said hose in said mold, filling said chambers with a liquid plastic material which contracts upon solidification, causing said plastic material to solidify and contract to form said bumper members and secure them to said hose solely by the frictional forces developed intermediate the internal surface of said bumper members and the outer surface of said hose upon contraction of said plastic material, and removing said hose with said bumper members frictionally locked thereto from said mold.

4. The method of forming an abrasion resistant hose assembly as set forth in claim 3 wherein said outer surface has longitudinally extending serrations therein and the step of filling said chambers with a liquid plastic material includes disposing a portion of said plastic material into said serrations within said bumper members to provide said bumper members with an internal surface which is mechanically interlocked with said outer surface thereby fixing said bumper members against relative rotation.

* * * * *